RICHARD STEINBERG
ISIDORE TURINSKY  INVENTORS.
JOSE I. VASQUEZ
BY

Albert M. Parker
ATTORNEY.

March 19, 1968　　R. STEINBERG ET AL　　3,373,803
HEAT TRANSFER ELEMENT
Filed June 23, 1965　　　　　　　　　　　　2 Sheets-Sheet 2
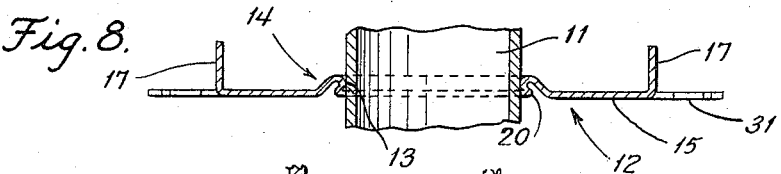
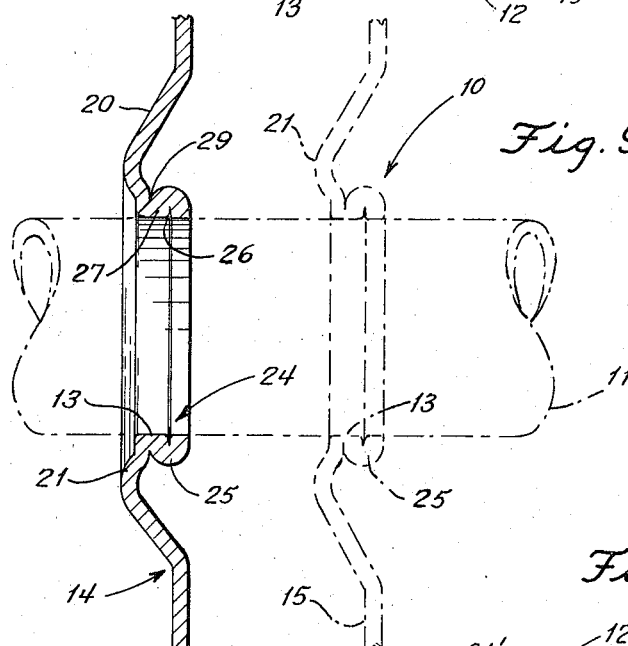
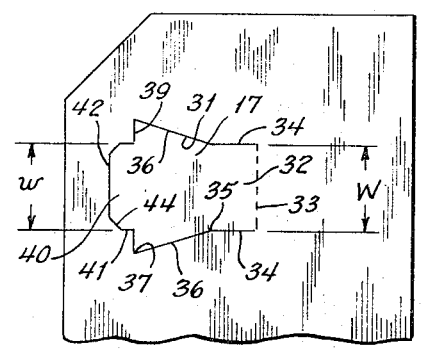
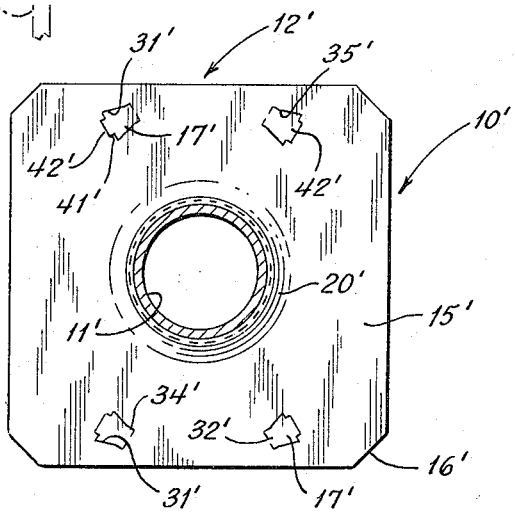
RICHARD STEINBERG
ISIDORE TURINSKY    INVENTORS.
JOSE I. VASQUEZ
BY
Albert M. Parker
ATTORNEY.

United States Patent Office 3,373,803
Patented Mar. 19, 1968

3,373,803
HEAT TRANSFER ELEMENT
Richard Steinberg, Babylon, Isidore Turinsky, Flushing, and Jose I. Vasquez, Jamaica, N.Y., assignors to Slant/Fin Corporation, Richmond Hill, N.Y., a corporation of New York
Filed June 23, 1965, Ser. No. 466,483
8 Claims. (Cl. 165—182)

ABSTRACT OF THE DISCLOSURE

The invention provides a novel improved heat exchanger, including a novel heat transfer fin, and the combination of the fin or a plurality of such fins with a fluid conducting conduit upon which they are mounted. A novel method of making the fin is also provided.

The fin incorporates novel tabs struck therefrom to space it from the next adjacent fin mounted on said conduit, and a novel central collar integral with the stock of the fin which is adapted compressively to engage the outer surface of the fluid conducting conduit upon which the fin is to be mounted.

---

This invention relates to an improved heat exchanger, and more particularly relates to an improved heat transfer fin, and to the combination of such fin, and more particularly a plurality of such fins, with a fluid conducting conduit.

It is an object of the present invention to provide a novel heat exchanging fin which is characterized by its simplicity, and the ease with which it is made.

Another object of the invention is the provision of a heat exchanging fin which has superior heat exchanging properties, and which has a novel, improved formation for interengagement with a fluid conducting conduit.

Yet a further object of the invention is the provision of a novel combination of fluid conducting conduit and a heat transfer fin of the present invention, such combination being particularly characterized by the tight interengagement between the fin and the conduit, and thus the efficiency of heat transfer between the conduit and the fin.

A still further object of the invention is the provision of the novel combination of a plurality of the heat transfer fins of the invention telescoped over and tightly engaging a fluid conducting tube, such combination including novel means on the fins for accurately spacing the fins and for interlocking them in alignment on the tube.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views.

FIG. 8 is a view in section of a finished fin produced from the blank of FIG. 6 and the intermediate blank of FIG. 7;

FIG. 9 is an enlarged fragmentary view in diametral section through the fin of FIG. 8, a tube on which the fin is adapted to be mounted, and a next succeeding fin in a fin stack on such tube being shown in phantom lines;

FIG. 10 is an enlarged view in elevation of a corner of a first embodiment of fin in accordance with the invention showing the tab on the fin prior to the bending of the fin out of the plane of the fin;

FIG. 11 is a view in front elevation of a second embodiment of fin in accordance with the invention, a fluid conducting conduit on which the fin is mounted being shown in section; and FIG. 12 is a view similar to FIG. 10, but with the fin turned to present the tab with its axis vertical, of the second illustrative embodiment of fin in accordance with the invention.

Figure 1:
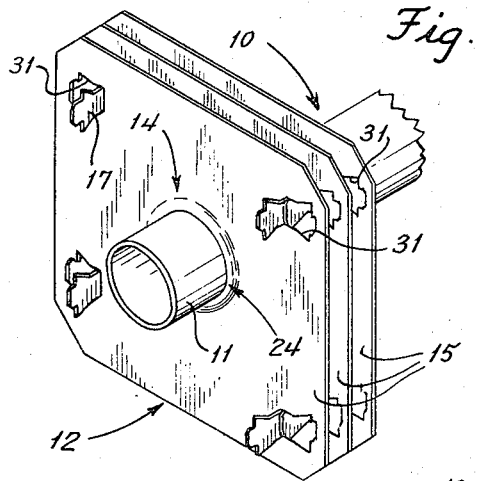
FIG. 1 is a fragmentary view in perspective of a finned heat exchanger tube in accordance with the present invention, the fins having a spacing and fin-interlocking configuration in accordance with a first embodiment of the invention.
Figure 2:
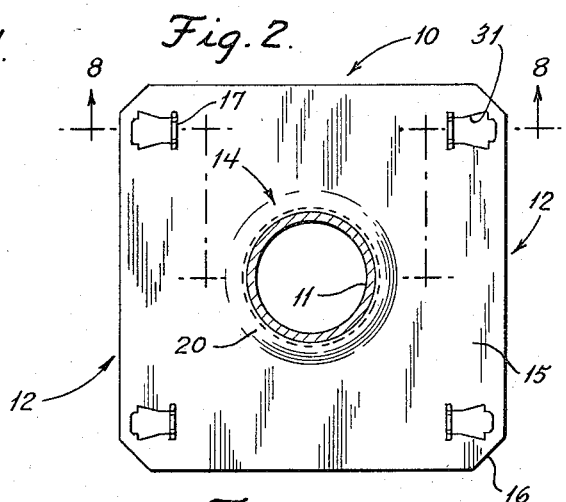
FIG. 2 is a view in front elevation of a fin of such first illustrative embodiment, the fin being shown mounted upon a fluid conducting tube, which is shown in transverse section.
Figure 3:
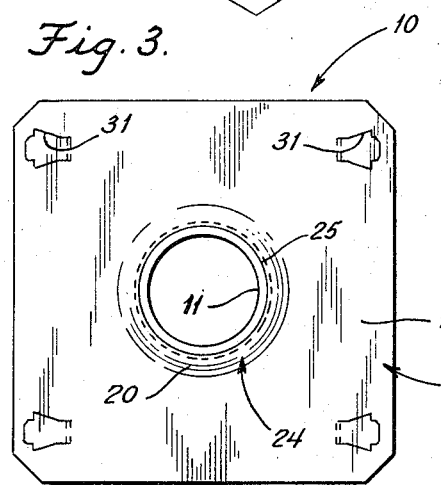
FIG. 3 is a view similar to FIG. 2, but with the fin being shown in rear elevation.
Figure 4:
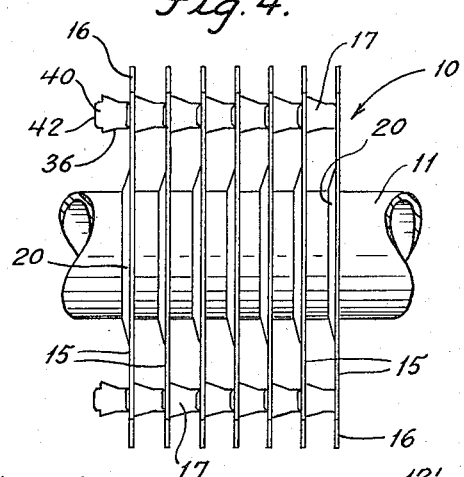
FIG. 4 is a fragmentary view in side elevation of a finned tube heat exchanger made in accordance with the first illustrative embodiment of the invention.
Figure 6:
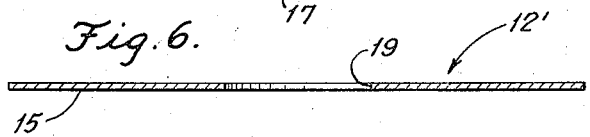
FIG. 6 is a view in section of a blank, in one of the first stages of its forming, for making a fin in accordance with the first disclosed embodiment thereof.
Figure 5:
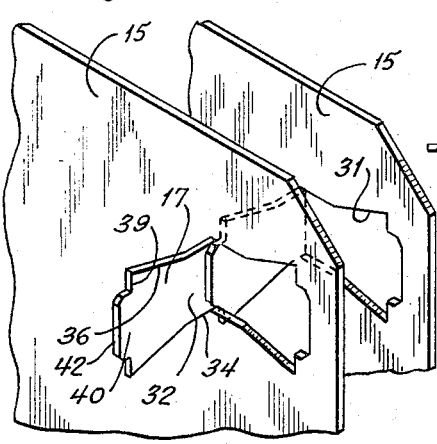
FIG. 5 is a fragmentary view in perspective of the corners of two consecutive stacked fins in accordance with the first illustrative embodiment in accordance with the invention, the figure showing the manner of interengagement between one of the tabs on one plate with the aligned tab-receiving opening in the succeeding fin of the fin stack.

As will be seen from the above, there are illustrated herein two embodiments of heat transfer fin and the combination thereof with a fluid conducting tube. The first such embodiment is illustrated in FIGS. 1–10, inclusive. The second embodiment, which differs from the first as to the shape and location of the fin-spacing tabs, is shown in FIGS. 11 and 12. Elements in FIGS. 11 and 12 which are similar to those in FIGS. 1–10, inclusive, are designated by the same reference characters but with added primes.

The combination of a stack of fins in accordance with the invention telescoped over a fluid conducting tube, hereinafter called an element, which is designated generally by the reference character 10 in FIGS. 1–10, inclusive, may advantageously be employed as a heating element. Thus the tube element 10 may be used, for example, as the heat exchanger element in so-called baseboard heating, or in radiators of other types, steam or hot water being circulated through the conduit 11 of the element. It is important, with such heat exchange element, that the fins of the element snugly engage the tube or conduit thereof at all times, thereby providing for the efficient conduction of heat from the conduit to the fins. It is also highly desirable that the fins be spaced uniformly from each other, that the fins be accurately aligned, that the corners of the fins be mutually braced to prevent their damage during installation, that the contact between successive fins shall not introduce undesirable noises into the system during its heating up and cooling down, and that as much as possible of the conduit of the system be left uncovered by the fins and/or their attaching means whereby air will have direct access to the surface of the conduit. The heat transfer fins and their combination with a fluid conducting conduit in accordance with both embodiments of the invention fulfill all of the above requirements. In addition, they are economical, easy to install, and are free from maintenance over a long service life.

In the embodiments shown, the fins 12, which may be made, for example, from sheet aluminum stock, are of generally square cross section but have their corners symmetrically cut therefrom at 16 so as to facilitate the removal of the fins from their forming dies and also to remove what otherwise would be rather easily bent sharp corners from the resulting fins. Each of the fins 12 has a central opening 13 therethrough around which there is disposed an annular formation 14, formed of the stock of the fin itself, which forcibly grippingly engages the conduit or tube 11, which may be made, for example, of copper. Each of the fins 12 has a plurality of spacing tabs formed from the body 15 of the fins, the tabs being located adjacent each of the respective corners of the fin.

It is to be understood that the fins 12 in accordance with the invention may be made of various materials, such as copper and steel, as well as of aluminum. It is also to be understood that the fins 12 may be made of an almost infinite number of geometric shapes, such as rectangular, oval, round, etc., as well as square.

The specific shape of the first illustrative embodiment of tab, designated 17, and of the opening 31 in the body 15 of the fin from which it is formed are shown in FIG. 10. It will suffice here generally to describe the tabs as extending all in the same direction normal to the body of the fin, and as having a pilot portion somewhat narrower than the root of the tab and laterally outwardly extending shoulders at the root of the pilot portion. When successive fins are assembled upon a conduit 11, to form an element 10 as shown in FIGS. 1–5, inclusive, the pilot or free end portion of the tabs enters the hole formed by the removal of the tab of the next succeeding fin, as shown particularly well in FIG. 5. The pilot portion is fairly tightly received within the hole in such next succeeding fin and overlies the root of the next succeeding tab. As a result, succeeding fins are accurately spaced from each other longitudinally of the tube and mutually brace each other against any crushing force applied to the finned tube.

The structure of the novel central tube gripping formation 14 on each fin whereby it is strongly secured to the conduit 11 is shown more particularly in FIG. 9. A consideration of such figure, as well as of FIGS. 6, 7, and 8, which show successive steps in the formation of a fin, is now in order.

In making a fin, a flat sheet blank 12' (FIG. 6) may conveniently be first cut out to shape and provided with a central hole 19 therethrough by a first set of dies, not shown. Following this, the blank 12' may be placed in a further set of dies which deforms the stock around the central hole 19 in the blank into an annular upwardly (FIG. 7) convexly rounded open bead or reversely bent flange 20, the stock radially inwardly of annular bead or flange 20 being drawn downwardly into a short central circular cylindrical sleeve 22. The sleeve 22 is smoothly connected to the upper, downwardly turned end of the convex portion 21 of the bead formation 20. In the embodiment shown, the crest of the convex surface of the bead 20 is disposed in a plane which lies a distance from the lower surface of the plate (FIG. 8) which is on the order of twice the thickness of the plate. Such distance will vary somewhat according to the thickness of the material of the plate.

Figure 7:
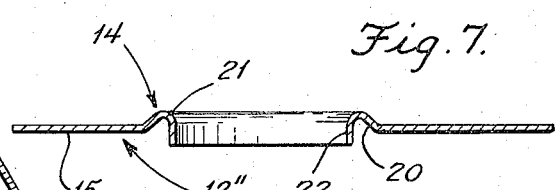
FIG. 7 is a view in section of the blank of FIG. 6 in an intermediate stage of its manufacture.

Following the formation of the blank into the shape 12", as shown in FIG. 7, the blank is then removed from the aforesaid second dies and is introduced into a third set of dies which completes the formation of the central tube gripping structure 14 of the fin, forms the spacing and locking tabs 17 on the fins, and bends such tabs normal to the plane of the body of the fin. In such further dies, the formation 20 of FIG. 7 is more or less preserved, with the exception of an axial shortening of the central portion thereof as shown in FIG. 9. Such final formation of the annular shape 24 shown in FIG. 9, generally speaking, is effected by the third set of dies which, while axially compacting the previously formed sleeve 22, causes the sleeve to bend upon itself to form the stock of sleeve 22 into a short sleeve or collar which is formed of stock or material which is generally S-shape in radial section. Thus what was the lower edge portion of sleeve 22 in FIG. 7 is bent radially inwardly to form a radially outwardly convex annulus 25 having a generally central fold line 26. Such annular portion 25 in turn is folded in a reverse direction about a fold line 29 (FIG. 9). Beyond the fold line 29 the stock of what was formerly the sleeve 22 is radially thickened at an annular zone 27 which connects the formation 25 to the radially inner end of the convex formation 21.

As a result of such deformation of the sleeve 22, the resulting structure 24 has a radial thickness which is appreciably greater than that of the stock from which the body of the fin is formed. The central opening through the formation 24 is of such diameter that the formation tightly grips a conduit 11 which is telescoped thereinto. Preferably as shown, the formation 24 has its lower (FIG. 8) or right-hand (FIG. 9) end lying generally coplanar with the lower or left-hand surface of the main body of the fin. As a result, the formation 24 is relatively short in a direction axially of the tube 11, leaving an appreciable length of the outer surface of the tube, designated 30, uncovered by either fins or the formations by means of which they are attached to the tube. As above explained, this construction is to be desired, since it permits the ready access of a circulating fluid such as air into immediate contact with the outer surface of the conduit. Thus the exchange of heat between such uncovered portion of the conduit 11 and the fluid circulating in such conduit is especially efficient.

The tab 17' of the embodiment of fin shown in FIGS. 11 and 12 is generally similar to tab 17 with the exception that the width W' of the root portion 32' and the width w' of the pilot portion 24' of tab 17' are markedly greater than the corresponding values for the tab 17. Otherwise the parts of the tab 17' perform the same fin-spacing function and are made similarly to those of tab 17.

A further difference between the fin 12, above described, and the fin 12' of FIG. 11 is that the tabs 17' of fin 12', although disposed in vertical aligned pairs, with one fin of each pair above the other, such pairs are disposed laterally symmetrically on opposite sides of the vertical center line of the fin, are located substantially inwardly of the corners of the fin so as to lie substantially in line with the opposite side surfaces of the tube 11' when the tabs are bent outwardly from the plane of the fin into their operative position. See FIG. 11. Not only that, but the tabs 17' are disposed so that the lines of fold 33' which connect them to the body of the fin lie substantially on oppositely inclined radii of the tube 11'.

The appreciable width of the tabs 17', taken with their angular disposition, above described, causes such tabs to function to direct air after it has contacted the uncovered portion of the tube 11', between the central means for attaching the fins to the tube, in a manner which is more efficient than that of the tabs 17 of the first described embodiment. Thus air is heated by contact with tube 11'. After such air has exchanged heat with the tube 11', it rises thereabove and passes between the upper pair of tabs 17', and with an increase in velocity. Such upper pair of tabs diverge in an upwardly direction, thereby tending to spread the rising heated air laterally above the heat exchanger. As a result of this function, that is, the direction of air by the upper tabs 17' after it leaves such tube, the construction of heat exchanger shown in FIG. 11 has proved to be particularly efficient.

Some of the advantages of the heat transfer fin, and of the combination of such fin with a fluid conducting conduit, will be apparent from the above description. Some of these advantages, as well as others, will now be pointed out.

As well as accurately spacing the fins 12 and 12' axially of the tubes 11, 11', respectively, the tabs 17, 17' interlock with the openings 31, 31' in the succeeding fins to prevent rotation of successive fins relative to each other. Despite substantial heating and cooling of the tube, the tube-engaging formation of the fins remain in tight contact with the tube, assuming that such formations have a press tight fit with the tube at room temperature. Such tight engagement with the tube also aids markedly in maintaining the fins in alignment. Further, a single edge of the sheet metal fins which engage the tube in some prior constructions, are noisy, being prone to "popping" or "oil canning" upon changes in temperature of the tube.

The massive but axially short, central tube gripping formations of the fins of the invention serve to increase the conduction of heat from the tube to the fins, or vice versa, without covering up the tube between fins to an extent which is at all comparable to that of prior constructions wherein an axially extended single-thickness sleeve is relied upon to secure the fins to the tube. Thus in the case of a heating element, the present construction provides for leaving exposed very appreciable lengths of hotter, uncovered tube, with which air can come into direct contact.

The dished or embossed annular formation 20 provides a desirable spring effect upon collar formation 24. Even if the formation 24 should tend to expand, the annular formation 20 will oppose such expansion and force the formation radially inwardly toward the tube.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus although described in connection with its use as a heating element, the finned tube of the invention may obviously be employed as a cooling or refrigerating element when a cooling fluid is circulated through tube 11'.

What is claimed is:

1. A heat transfer fin adapted to be assembled upon a tube in aligned spaced relationship with similar fins, comprising a flat plate having a central opening therethrough, a short axially extending collar integral with the plate defining the central opening, and a reversely bent dished annular flange which is axially open in one direction and is integral with the plate and the collar and coaxial of the collar interposed between the body of the plate and the collar, the annular flange being convex and rising above a first surface of the plate in a first direction normal to the plane of the plate, the radially inner edge of the flange being inclined in a direction radially inwardly and in a second opposite direction normal to the plane of the plate, the collar being located substantially wholly between the radially inner edge of the flange and the plane of the second surface of the plate, the collar being formed of the material of the plate folded into generally S form and axially compacted so that the folds of the material forming the collar lie generally in planes transverse to the axis of the central opening through the fin and are substantially in contact.

2. A heat transfer fin as claimed in claim 1, wherein the crest of the convex surface of the reversely bent annular flange is disposed in a plane which lies a distance from the first surface of the plate which is on the order of twice the thickness of the plate.

3. A heat transfer fin as claimed in claim 1, wherein the collar has an effective radial thickness substantially greater than the thickness of the plate.

4. A heat transfer fin as claimed in claim 1, wherein the collar has axially spaced annular fold lines and three folds of which the inner fold is the radially inner edge of the dished annular flange and the other two, outer folds are disposed axially beyond the inner fold in said second direction.

5. A heat transfer fin as claimed in claim 4, wherein the metal in the portion of the collar including the two outer folds and the annular fold line therebetween has a thickness of section which is substantially greater than that of the body of the plate and the dished annular flange.

6. A heat exchanger element comprising a fluid conducting tube, and a plurality of heat transfer fins each having a central hole therein telescoped in aligned spaced relationship on the tube, comprising a flat plate having a central opening therethrough, a short axially extending collar integral with the plate defining the central openings, and a reversely bent dished annular flange which is axially open in one direction and is integral with the plate and the collar and coaxial of the collar interposed between the body of the plate and the collar, the annular flange being convex and rising above a first surface of the plate in a first direction normal to the plane of the plate, the radially inner edge of the flange being inclined in a direction radially inwardly and in a second opposite direction normal to the plane of the plate, the collar being located substantially wholly between the radially inner edge of the flange and the plane of the second surface of the plate, the collar being formed of the material of the plate folded into generally S form and axially compacted so that the folds of the material forming the collar lie generally in planes transverse to the axis of the central opening through the fin and are substantially in contact.

7. A heat exchanger element as claimed in claim 6, wherein the collars of the fins have axially spaced annular fold lines and three folds of which the inner fold is the radially inner edge of the dished annular flange and the other two, outer folds are disposed axially beyond the inner fold in said second direction.

8. A heat exchanger element as claimed in claim 7, wherein the metal in the portion of the collar on each of the fins, including the two outer folds and the annular fold line therebetween, has a thickness of section which is substantially greater than that of the body of the plate and the dished annular flange.

References Cited

UNITED STATES PATENTS

| | | | |
|---|---|---|---|
| 1,630,749 | 5/1927 | Kjerner | 165—182 |
| 1,920,357 | 8/1933 | Clark | 165—182 |
| 2,012,269 | 8/1935 | Cornell Jr. | 165—182 |
| 2,053,239 | 9/1936 | Forrer et al. | 133—118 X |
| 2,245,069 | 6/1941 | Clarke | 113—118 X |
| 2,307,355 | 1/1943 | Bredeson | 165—181 X |
| 2,430,631 | 11/1947 | Eskra | 165—182 |
| 2,804,286 | 8/1957 | Pintarelli | 165—182 |
| 3,011,466 | 12/1961 | Simpelaar | 165—182 |

FOREIGN PATENTS 679,809    2/1964    Canada.

ROBERT O'LEARY, *Primary Examiner.*

T. W. STREULE, *Assistant Examiner.*